INVENTOR
R. E. WADDELL
BY Harry L. Newman
ATTORNEY

Feb. 11, 1969 R. E. WADDELL 3,427,401

AUTOMATIC REPORTING TELEPHONE THAT TRANSMITS MESSAGE UPON RECEIPT OF RESPONSE SIGNAL DURING PREDETERMINED INTERVALS

Filed Dec. 22, 1964 Sheet 4 of 5

Feb. 11, 1969 R. E. WADDELL 3,427,401

AUTOMATIC REPORTING TELEPHONE THAT TRANSMITS MESSAGE UPON RECEIPT OF RESPONSE SIGNAL DURING PREDETERMINED INTERVALS

Filed Dec. 22, 1964

United States Patent Office

3,427,401

Patented Feb. 11, 1969

3,427,401

AUTOMATIC REPORTING TELEPHONE THAT TRANSMITS MESSAGE UPON RECEIPT OF RESPONSE SIGNAL DURING PREDETERMINED INTERVALS

Richard E. Waddell, Indianapolis, Ind., assignor to Bell Telephone Laboratories, Incorporated, New York, N.Y., a corporation of New York Filed Dec. 22, 1964, Ser. No. 420,415
U.S. Cl. 179—2 8 Claims
Int. Cl. H04m *11/02, 11/04*

ABSTRACT OF THE DISCLOSURE

An apparatus for reporting alarm conditions at an unattended location includes motor driven printed circuit boards for providing switching logic, an automatic dialer for calling a preselected station, a transmitter for transmitting a coded audible signal to the called station, and an amplifier, monostable multivibrator, and bistable multivibrator for receiving and responding to a signal from the called station.

Figure 1:
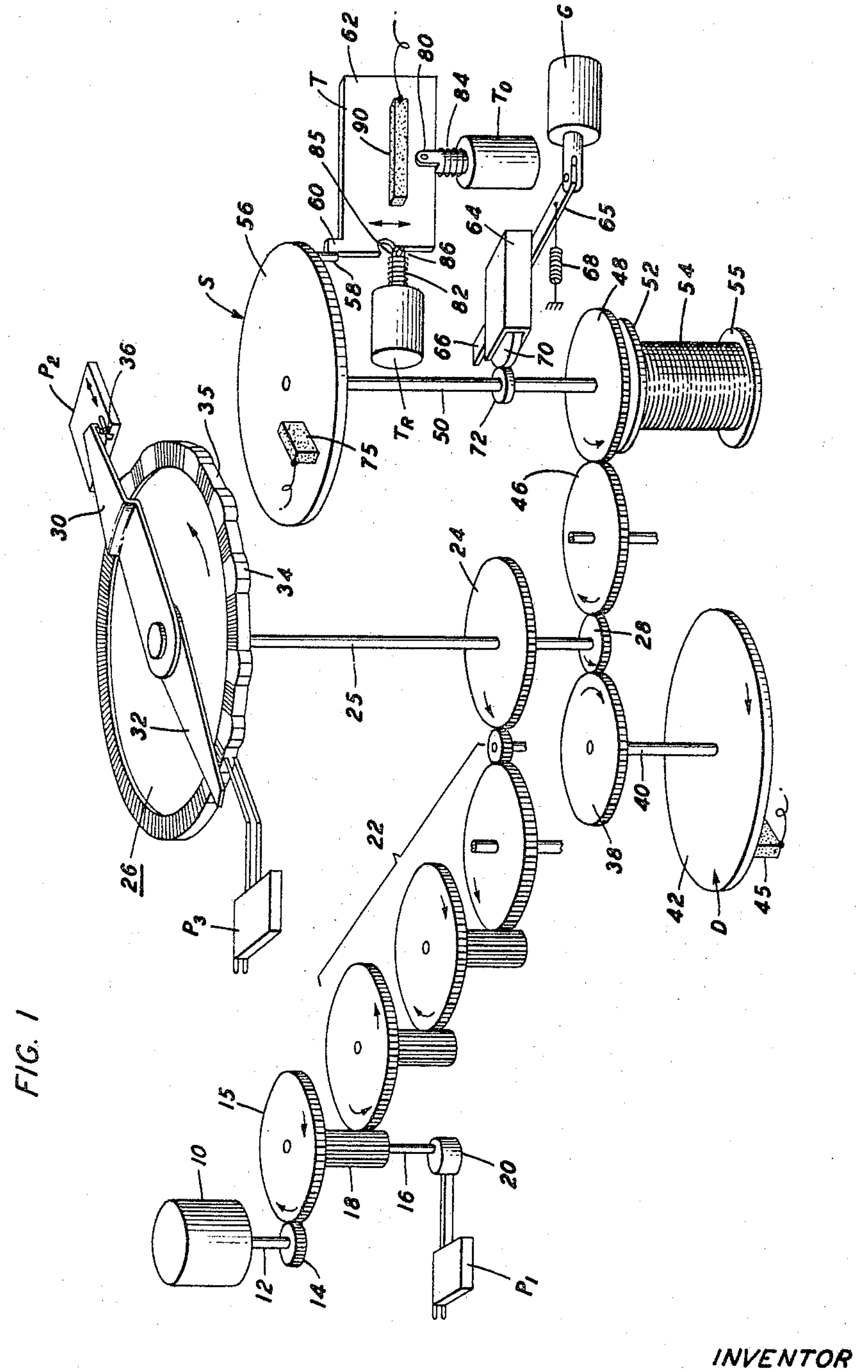

This invention relates to automatic alarm devices and particularly to such devices that operate in conjunction with a conventional automatic telephone system.

In recent years, it has become increasingly common for unattended equipment to automatically perform a variety of functions at remote locations. Typical examples include electrical switching at power substations and valve regulation at pipe line control stations.

However, with unattended equipment at a remote location there is the problem of how to know when a malfunction or failure of the equipment occurs. It is uneconomic to employ personnel to maintain a full time vigilance for the rare occasions when their services are needed. Yet, on the other hand, the consequences of not quickly finding out that a malfunction or failure has occurred may be severe. Thus the need has arisen for a device that in response to such an occurrence reports appropriate information to a supervisory station.

It is possible to provide private communication means between each remote location and the supervisory station, but the occasional use that would be made of this private means does not justify the expenditure that it would entail. A more reasonable solution is to take advantage of the public communication facilities offered by the local telephone system.

Telephone lines connecting remote locations to a supervisory station may be leased full time, or each remote location and the supervisory station may be treated as an ordinary subscriber with connections being made therebetween by means of the automatic switching equipment of a central office. The former offers the advantage of assuring access between the remote locations and the supervisory station, but its cost is high. The later is quite inexpensive, but it involves the risk that the circuits may be unavailable when the reporting device at a remote location tries to reach the supervisory station. In addition, it involves the risk that the switching equipment may erroneously connect the remote location to the wrong station.

An object of this invention is to provide an automatic reporting device that operates in conjunction with a conventional automatic telephone system.

Specifically, an object of this invention is to provide an automatic reporting device that is adapted to utilize the regular single party subscriber service of a telephone system and maximize the probability of successfully reporting to the supervisory station.

These and other objects of this invention are achieved in an automatic reporting telephone that upon the occurrence of a predetermined condition seizes a telephone line, delays for a dial tone, and calls a preselected station. The automatic reporting telephone thereafter delays to permit a monitor at the called station to answer, and then transmits a coded identification request signal consisting of alternate intervals of sound and silence. If the automatic reporting telephone receives the proper response signal, that is, if during certain of the silent intervals the automatic reporting telephone receives a signal having a particular amplitude and frequency, the automatic reporting telephone causes to be transmitted a message apprising the monitor of the location of the automatic reporting telephone and of the occurrence of the predetermined condition.

Should the automatic reporting telephone fail to receive this response signal, which will occur if the line is busy, the monitor at the called station does not answer, or a wrong number is reached, the automatic reporting telephone drops the line, and after a delay of several minutes reinitiates the call.

Because in the usual case the automatic reporting telephone operates infrequently, it is designed to permit the monitor to check on its operability from his distant station. To this end, the automatic reporting telephone answers an incoming call and transmits the identification request signal. If the automatic reporting telephone receives the proper response signal to the identification request signal, it is caused to perform in substantially the same manner as if the predetermined condition had occurred. Thus after the monitor gives the proper response signal to the identification request signal, he hangs up, and if the automatic reporting telephone is operating properly, it proceeds to initiate a call in the aforedescribed manner.

A feature of this invention resides in the employment of a coded identification request signal to which the communicating party must provide a response signal of a particular character in order to initiate either the transmission of a message or the complete operation of the automatic reporting telephone. In the former instance, the required response signal informs the automatic reporting telephone that a monitor has in fact been reached and assures that the message is only transmitted to the monitor. In the latter instance, the required response signal assures that only a monitor is able to initiate the check on the operability of the automatic reporting telephone. In both instances, the response signal required of the monitor may be produced by operating the dial on his telephone set. No supplementary signaling apparatus is needed at the monitor station. Hence, the monitor's station may be changed to suit his needs.

A complete understanding of the invention and of this and other features and advantages thereof may be gained from consideration of the following detailed description taken in conjunction with the accompanying drawing wherein one embodiment of the invention is illustrated. It is to be expressly understood, however, that the drawing is for the purpose of illustration and description and is not to be construed as defining the limits of the invention.

Figure 2:
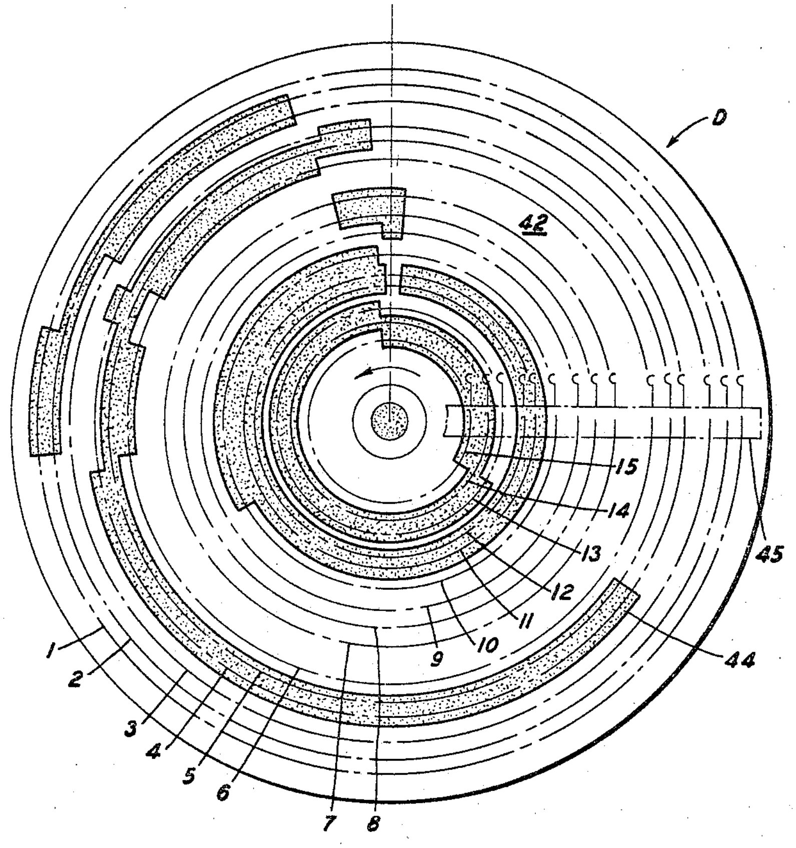
Figure 3:
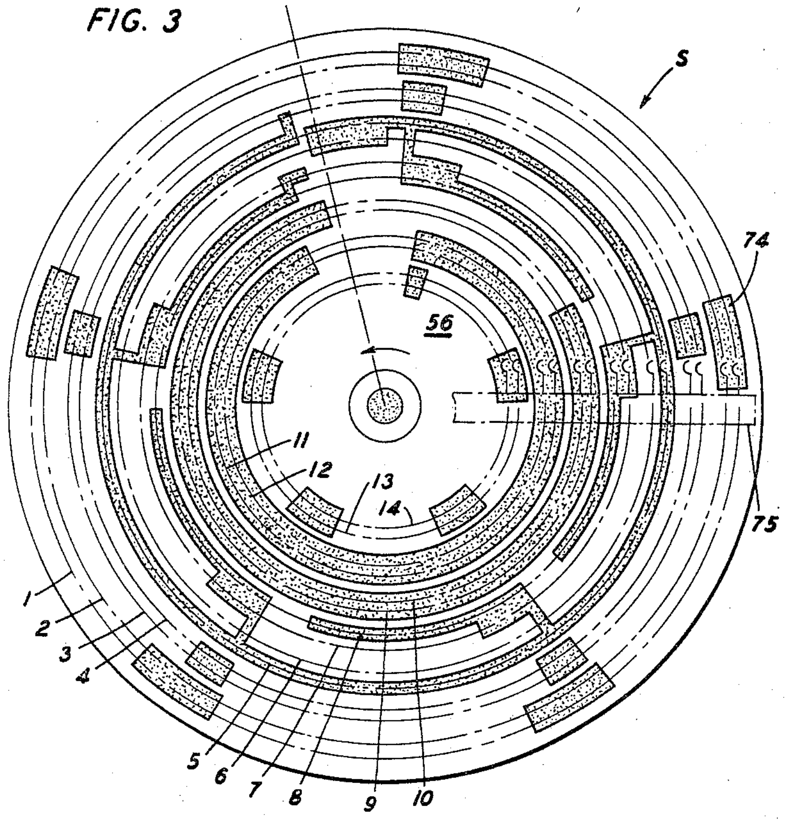
Figure 4:
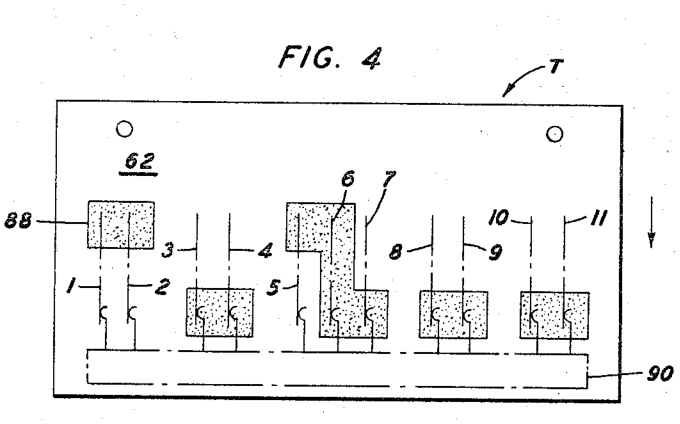
Figures 5, 5A:
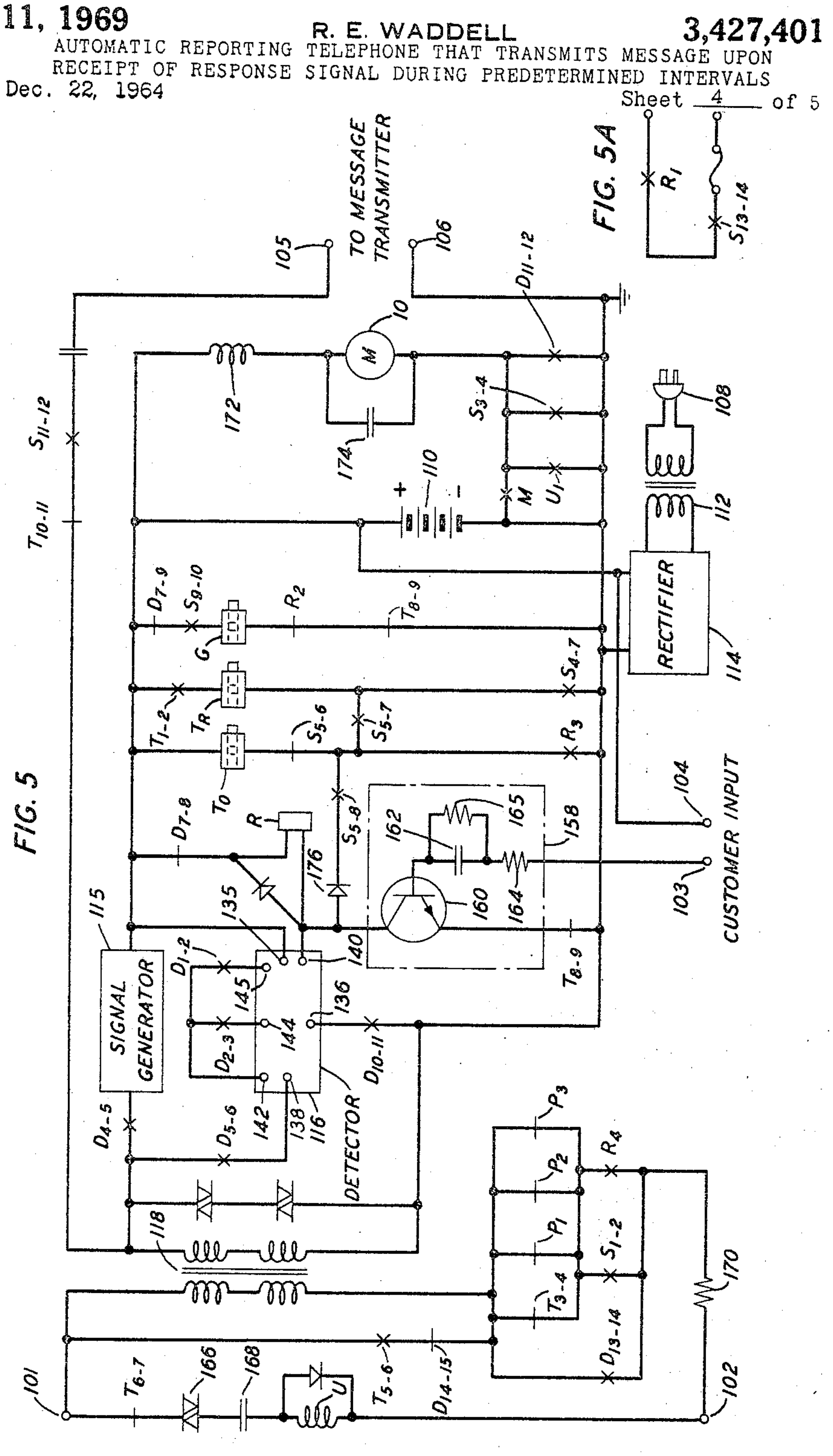
Figure 6:
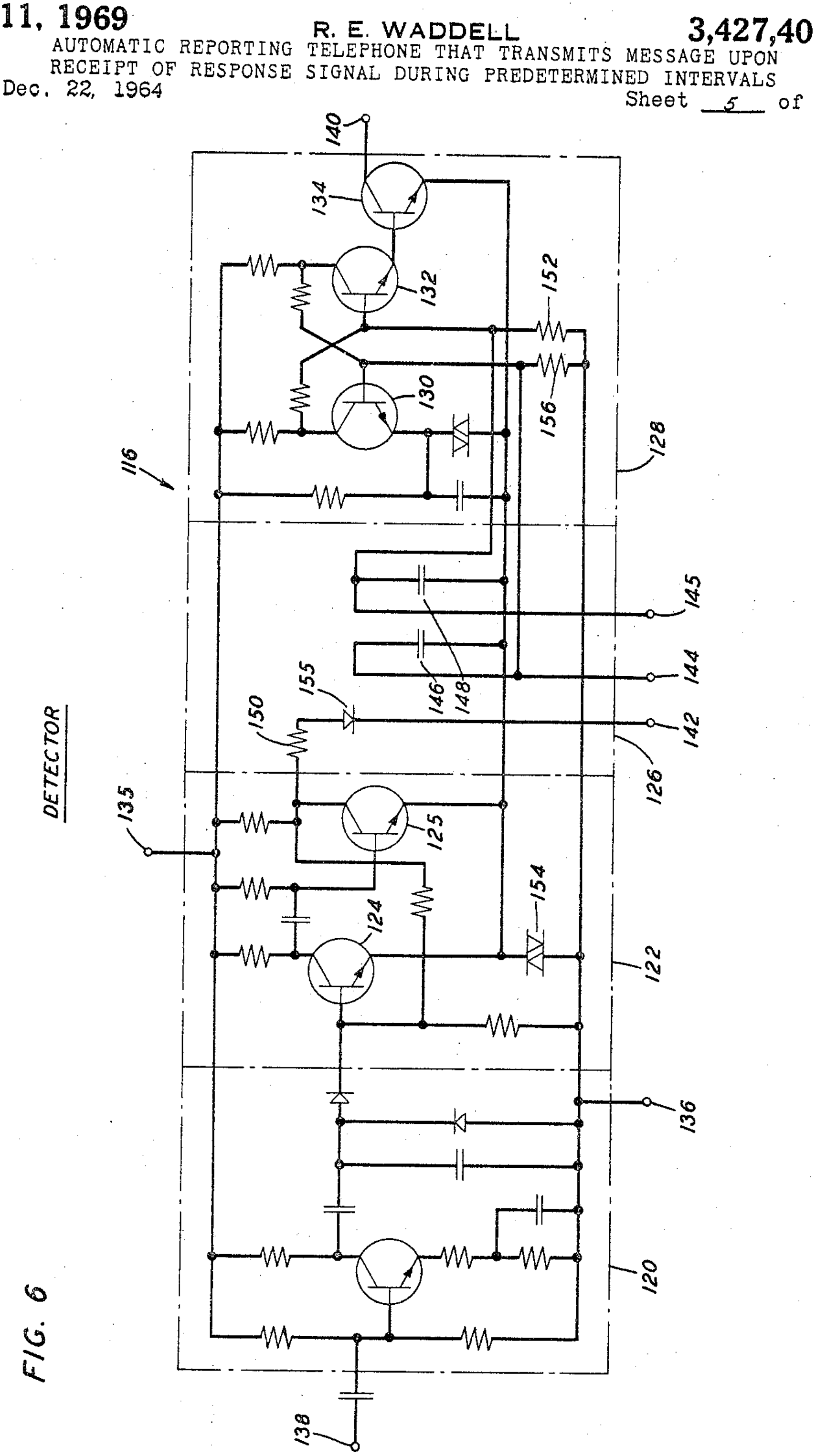

In the drawing:

FIG. 1 is a schematic drawing showing the mechanical aspects of the automatic reporting telephone of this invention;

FIGS. 2, 3, and 4 are plan views of the three programmed members that provide the switching logic for the automatic reporting telephone;

FIGS. 5 and 5A are schematic drawings of the electrical circuit of the automatic reporting telephone; and FIG. 6 is a schematic drawing of the detector circuit that is employed in the automatic reporting telephone.

*Mechanical description*

Referring to the drawings and FIG. 1 in particular, the automatic reporting telephone includes a motor 10 having a shaft 12 on which is affixed a pinion 14. The pinion 14 meshes with a gear 15 fixedly mounted on a rotatable shaft 16, the shaft also having a gear 18 and a pulsing cam 20 fixedly mounted thereon. A pulsing switch $P_1$ has a pair of normally closed contacts extending into juxtaposition with the pulsing cam 20, and the cam is shaped so that during a portion of each revolution thereof the contacts are opened once. Advantageously, the pulsing cam and contact arrangement employed are the same as that displosed in Patent 2,963,554, issued to H. J. Hershey on Dec. 6, 1960.

As hereinafter disclosed, each opening of the normally closed pulsing contacts $P_1$ acts to interrupt a telephone line and thereby transmits a direct current pulse thereover, and since the pulsing rate generally employed in telephone systems is ten pulses per second, the pulsing cam 20 must rotate at ten revolutions per second, or in other words, at six hundred revolutions per minute. Consequently, the rotational speed of the shaft 12 of the motor 10 and the number of teeth on the pinion 14 and gear 15 are selected to provide the shaft 16 with a rotational speed of six hundred revolutions per minute. Furthermore, as the pulsing rate is generally limited to a plus or minus five percent tolerance, the motor 10 is selected to have speed regulation characteristics within this tolerance under the anticipated variations in voltage and load.

The gear 18 acting through a gear train 22 drives a gear 24 fixedly mounted on a shaft 25, the shaft also having a number selecting member 26 and a pinion 28 fixedly mounted thereon. The number selecting member 26 in combination with an initiating arm 30, a terminating arm 32, and a plurality of interdigital clips 34 provide the means by which a telephone number to be called by the automatic reporting telephone is preselected, and these elements interact with the pulsing switch $P_1$, an initiating and terminating switch $P_2$, and an interdigital switch $P_3$ to transmit the telephone number.

The number selecting member 26 includes a rim 35, and the initiating and terminating switch $P_2$ is positioned adjacent thereto, the switch having a pair of normally closed contacts. Advantageously, the switch is similar to that disclosed in the application of A. J. Chase and H. J. Hershey, Ser. No. 150,716, filed Nov. 7, 1961, and assigned to the assignee of this invention, in that it is operated by the rectilinear displacement of a pin, the pin being indicated in FIG. 1 by the reference character 36. When the pin 36 is in a rearward position, rearward being toward the top of FIG. 1, the contacts are in their normal condition, and when the pin is in its forward position, the normally closed contacts are open.

The pin 36 is displaced between its rearward and forward positions by the initiating arm 30 and the terminating arm 32, the arms extending radially from the center of the number selecting member 26 beyond the rim 35. The initiating and terminating arms 30 and 32 are secured to the number selecting member 26 so as to rotate therewith, but the position of the terminating arm is adjustable to vary the angle included between it and the initiating arm.

The initiating arm 30 has a depending flange at the outer end thereof that extends at an angle to the longitudinal axis thereof such that the left side of the flange, when viewed from the center of the number selecting member 26, is a greater distance from the center of the number selecting member than the right side of the flange. As shown in FIG. 1, the number selecting member 26 rotates in a counterclockwise direction, and the flange is adapted to engage the pin 36 and displace it from its rearward position to its forward position.

Conversely, the terminating arm 32 has an edge at the outer end thereof that extends at an angle to the longitudinal axis thereof such that the right side of the edge, when viewed from the center of the number selecting member 26, is a greater distance from the center of the number selecting member than the left side of the edge. As the number selecting member 26 rotates, this edge is adapted to engage the pin 36 and displace it from its forward position to its rearward position.

The normally closed contacts of the initiating and terminating switch $P_2$ are connected in parallel with the normally closed pulsing contacts $P_1$, and hence prior to the actuation of the pin 36 by the initiating arm 30 and subsequent to the actuation of the pin by the terminating arm 32, a shunt path is provided around the pulsing contacts and the opening thereof cannot interrupt the telephone line.

The plurality of interdigital clips 34 are positioned on the rim 35 of the number selecting member 26 between the trailing edge of the initiating arm 30 and the forward edge of the terminating arm 32. The interdigital clips 34 are arcuate in shape and closely embrace the rim 35, and they are movable along the length of the rim. One side of the rim 35 has a plurality of equally sized teeth that are equally spaced around the entire perimeter thereof, and the teeth cooperate with the interdigital clips 34 to locate the clips in particular spaced positions on the rim.

The interdigital switch $P_3$ is position in juxtaposition with the rim 35 of the number selecting member 26 and has a pair of contacts that are spaced from and electrically insulated from one another and are biased toward the peripheral surface of the rim. The peripheral surface of the rim 35 is electrically nonconducting, and thus when the interdigital contacts $P_3$ are in engagement with the peripheral surface, they are open. The interdigital clips 34, however, are electrically conducting, and hence when the interdigital contacts $P_3$ are in engagement with one of the interdigital clips, a conductive path is provided between the contacts and they are closed.

The interdigital contacts $P_3$ are also connected in parallel with the pulsing contacts $P_1$, and thus when the interdigital contacts are in engagement with the interdigital clips 34, a shunt path is provided around the pulsing contacts, and the opening thereof cannot interrupt the telephone line. When, on the other hand, the interdigital contacts $P_3$ are in engagement with the peripheral surface of the rim 35 of the member selecting member 26, the shunt path is open and each opening of the pulsing contacts $P_1$ acts to interrupt the telephone line.

The pulsing contacts $P_1$ are opened once for each revolution of the pulsing cam 20 and advantageously the size and spacing of the teeth on the member selecting member 26 are such that the gear train 22 joining the gear 18 with the gear 24 is such that the member selecting member rotates through the distance of one tooth thereon for each revolution of the pulsing cam 20. Hence each tooth on the number selecting member 26 represents one pulse interval. In one specific embodiment of the invention, which is an embodiment that will be referred to throughout the detailed description, the number selecting member 26 rotates 3.49 revolutions per minute or one revolution every 17.2 seconds, and has 172 teeth. The 172 pulse intervals permit the calling of a telephone number of fourteen digits in length.

To preselect a telephone number, a first interdigital clip 34 is positioned on the rim 35 of the number selecting member 26 so as to extend slightly beyond the trailing edge of the initiating arm 30, and a second interdigital clip is spaced from the first interdigital clip in a clockwise direction a number of pulse intervals equal to the first digit of the telephone number. A third interdigital clip 34 is spaced from the second interdigital clip a number of pulse intervals equal to the second digit, a fourth interdigital clip is spaced from the third interdigital clip a number of pulse intervals equal to the third digit, and so on. The terminating arm 32 is then positioned over the second of two interdigital clips 34 defining the last digit of the telephone number to prevent pulsing of the telephone line subsequent to the transmission of the last digit.

Advantageously, the interdigital clips 34 are each of a length corresponding to six pulse intervals to thereby provide the standard interdigital time period of 0.6 second. Accordingly, in the spectific embodiment, the interdigital clips 34 are equal in length to six teeth on the number selecting member 26.

The pinion 28 on the shaft 25 drives a gear 38 fixedly mounted on a shaft 40 along with a programmed member 42. Referring also to FIG. 2, the programmed member 42 comprises a dielectric disc having a particular conductive pattern 44 printed on the undersurface thereof. A row of fifteen contact members extends into engagement with the undersurface of the programmed member 42, and the contact members are mounted in a stationary holder 45 so as to be spaced along a radius of the programmed member and insulated from one another.

As the programmed member 42 rotates, the programmed member rotating in a counterclockwise direction with respect to the contact members, the contact members describe a grid of fifteen concentric circles on the undersurface of the programmed member. This grid is shown in FIG. 2 with a reference character assigned to each circle to indicate the number of the particular contact member that describes that circle. It is seen from this grid that during each revolution of the programmed member 42, some adjacent pairs of contact members are at times in engagement with common portions of the conductive pattern 44.

When an adjacent pair of contact members is in engagement with a common portion of the conductive pattern 44, they are interconnected thereby and may be properly referred to as a pair of closed contacts. When, on the other hand, one or both of this pair of adjacent contact members are not in engagement with a common portion of the conductive pattern 44, in which case one or both of the contact members are in engagement with the dielectric surface of the programmed member 42, the contact members are not interconnected and may be properly referred to as a pair of open contacts.

From a close examination of FIG. 2, it is seen that the contact members interact with the programmed member 42 to provide ten pairs of sequentially actuated contacts, which for purposes of brevity will be referred to as sequential contacts. These ten pairs of sequential contacts comprise a sequential switching means D, and the pairs of sequential contacts are identified as $D_{1-2}$, $D_{2-3}$, $D_{4-5}$, $D_{5-6}$, $D_{7-8}$, $D_{7-9}$, $D_{10-11}$, $D_{11-12}$, $D_{13-14}$ and $D_{14-15}$, the subscripts indicating the particular contact members and portions of the programmed member 42 comprising the pairs of contacts. The pairs of sequential contacts are referred to as normally open or normally closed depending upon the condition they are in when the programmed member 42 is in a rest position, the rest position being indicated in FIG. 2 by a dashed radial line. It is seen from the figure that the sequential contacts $D_{7-8}$, $D_{7-9}$, and $D_{14-15}$ are normally closed, while all the rest are normally open.

The gear ratio between the gear 38 and the pinion 28 is such that the programmed member 42 rotates one-third as fast as the number selecting member 26. Thus, in the specific embodiment, the programmed member 42 rotates at 1.162 revolutions per minute or 51.6 seconds per revolution. The pinion 28, besides driving the gear 38 also drives a gear 46 that in turn drives a gear 48, the gear 48 being driven in a counterclockwise direction. The gear 48 is rotatably mounted on a shaft 50, and a disc type slip clutch 52 that is also rotatably mounted on the shaft 50 couples the gear 48 to a motor spring 54. One end of the motor spring 54 is secured to the slip clutch 52 while the other end of the motor spring is secured to a disc 55 fixedly mounted on the shaft 50.

As the gear 48 rotates in a counterclockwise direction, it tends to rotate the slip clutch 52 in a counterclockwise direction, and the slip clutch in turn tends to rotate the end of the motor spring 54 to which it is secured in a counterclockwise direction. The motor spring 54, however, tends to rotate the slip clutch 52 in a clockwise direction, and when the clockwise force exerted by the motor spring 54 on the slip clutch becomes equal to the counterclockwise force exerted by the gear 48 on the slip clutch, the gear 48 commences to move relative to the slip clutch.

The motor spring 54 also tends to rotate the disc 55 and thereby the shaft 50 in a counterclockwise direction. The shaft 50, however, is not normally able to rotate freely. A programmed member 56 fixedly mounted on the shaft 50 has a finger 58 depending therefrom, and a tab 60 on a programmed member 62 extends into the path of the finger when the programmed member 62 is in an upward position, the programmed member being reciprocally movable between an upward and a downward position. With the finger 58 in engagement with the tab 60, the rotation of the programmed member 56 and thereby the shaft 50 is prevented. Furthermore, when the prorammed member 62 is in its downward position, whereby the tab 60 is removed from the path of the finger 58, the rate of rotation of the shaft 50 is normally limited by a clock escapement 64.

The clock escapement 64 is mounted on a lever 65, one end of which pivots about a pin 66, and a spring 68 biases the lever so as to move a gear 70 of the clock escapement into engagement with a pinion 72 fixedly mounted on the shaft 50. Thus the clock escapement 64 normally determines the rotational speed of the shaft 50. In the specific embodiment, the clock escapement 64 acting through the gear 70 and the pinion 72 limits the rotation of the shaft 50 and thereby the programmed member 56 to one revolution per thirty minutes.

The end of the lever 65 opposite to the pin 66 is secured to the armature of a release solenoid G, and when the release solenoid G is energized, the clock escapement 64 is withdrawn from the pinion 72. The shaft 50 is then free to rotate, and the motor spring 54 acts on the disc 55 to rotate the shaft until its motion is arrested by the engagement of the finger 58 with the tab 60 on the programmed member 62.

Referring to FIGS. 1 and 3, the programmed member 56 comprises a dielectric disc having a particular conductive pattern 74 printed on one surface thereof. A row of fourteen contact members, which are mounted in a holder 75 so as to be insulated from one another, is spaced along a radius of the programmed member 56 and extends into engagement with the surface thereof on which the conductive pattern 74 is printed. As the programmed member 56 rotates, the contact members describe a grid of concentric circles, which grid is shown in FIG. 3 with a reference character assigned to each circle to indicate the particular contact member that describes that circle.

The contact members interact with the programmed member 56 to provide a sequential switching means S having nine pairs of sequential contacts. These pairs of sequential contacts are identified as $S_{1-2}$, $S_{3-4}$, $S_{4-7}$, $S_{5-6}$, $S_{5-7}$, $S_{5-8}$, $S_{9-10}$, $S_{11-12}$, and $S_{13-14}$, the subscripts indicating the particular contact members and portions of the programmed member 56 comprising the pairs of contacts. As seen by the dashed radial line indicating the rest position of the programmed member 56, the sequential contacts $S_{5-6}$ are normally closed while all the rest are normally open.

Turning to FIGS. 1 and 4, the programmed member 62 is associated with two solenoids $T_0$ and $T_R$. The solenoid $T_0$ has an armature 80 that is secured to the bottom of the programmed member 62, while the solenoid $T_R$ has an armature 82 that extends into juxtaposition with the side of the programmed member. The armatures 80 and 82 respectively have spring members 84 and 85 associated therewith, and each spring member biases its associated armature toward an extended position. In what is considered to be the normal condition of the solenoids, the armature 80 of the solenoid $T_0$ is in an extended position, whereby the programmed member 62 is in an upward position. The armature 82 of the solenoid $T_R$, however, is only in a partially extended position, the outward movement of the armature being limited by the engagement of a pin 86 projecting laterally therefrom with the side edge of the programmed member 62.

When the solenoid $T_0$ is energized, the armature 80 is retracted, and it pulls the programmed member 62 to a downward position. As the programmed member 62 reaches the downward position, a notch in the side of the programmed member is moved into juxtaposition with a pin 86, and the spring 85 acting on the armature 82 moves the pin into the notch. The pin 86 blocks the upward movement of the programmed member 62, and thus when the solenoid $T_0$ is de-energized, the programmed member remains in its downward position. When the solenoid $T_R$ is subsequently energized, the armature 82 is retracted, and the pin 86 is withdrawn from the notch in the programmed member 62. The spring member 84 acting on the armature 80 of the solenoid $T_0$ then returns the armature to its extended position and thereby returns the programmed member 62 to its upward position.

The programmed member 62 comprises a dielectric card having a particular conductive pattern 88 on one face thereof, and a row of eleven spaced contact members insulatedly mounted in a stationary holder 90 extends into engagement with this face. As the programmed member 62 moves from its upward position to its downward position, the contact members describe a grid of eleven parallel lines. This grid is shown in FIG. 4 with a reference character assigned to each line to indicate the number of the particular contact member that describes that line. As seen from this grid, the contact members interact with the programmed member 62 to provide six pairs of contacts. These pairs of contacts comprise a switching means T, and the pairs of contacts are identified as $T_{1-2}$, $T_{3-4}$, $T_{5-6}$, $T_{6-7}$, $T_{8-9}$, and $T_{10-11}$, the subscripts indicating the particular contact members and portions of the programmed member 62 comprising the pairs of contacts. Since the upward position of the programmed member 62 is the normal position, the contacts $T_{1-2}$ and $T_{5-6}$ are normally open while all the rest are normally closed.

*Electrical description*

Referring to FIG. 5, the circuit of the automatic reporting telephone includes a pair of terminals 101 and 102 respectively adapted to be connected to the tip and ring conductors of a telephone line, a pair of terminals 103 and 104 adapted to be connected to the particular apparatus that the automatic reporting telephone is to monitor, and a pair of terminals 105 and 106 adapted to be connected to the output of a message transmitter associated with the automatic reporting telephone. Advantageously, the message transmitter is a tape recorder having a continuous loop of tape on which is recorded the location of the automatic reporting telephone and the predetermined condition that the telephone is to respond to.

The circuit of the automatic reporting telephone further includes a plug 108 that is adapted to be connected to a standard 110 volts, 60 cycle power supply. This power source serves to maintain the charge on a battery 110, a transformer 112 and a rectifier 114 intermediate the plug 108 and the battery 110 providing the necessary direct current voltage.

The switching elements of the circuit comprise an input detector relay R and an answering relay U in addition to the sequential switching means D and S, the switching means T, the pulsing switch $P_1$, the initiating and terminating switch $P_2$, and the interdigital switch $P_3$. The input detector relay R has three pairs of normally open contacts $R_1$, $R_3$, and $R_4$ and one pair of normally closed contacts $R_2$. The answering relay U only has a pair of normally open contacts $U_1$.

Other major elements of the circuit comprise an audible signal generator 115 and detector 116. The audible signal generator 115 advantageously comprises a transistor oscillator such as that discolsed in FIG. 3 of the copending application of L. A. Meacham and F. West, Ser. No. 759,474, filed Sept. 8, 1958, now U.S. Patent No. 3,184,554, and assigned to the assignee of this invention. At a particular stage in the operation of the automatic reporting telephone, the signal generator 115 is periodically connected across the battery 110 and energized thereby, and during each of these periods the signal developed by the signal generator is transmitted out on the telephone line via a transformer 118. Thus a party at the station called by the automatic reporting telephone hears alternate intervals of sound and silence, and this coded signal serves as an identification request signal, that is, a request for the party to identify himself. He does this by responding in a particular manner during particular ones of the silent intervals.

The detector 116 is operated by the responses of the called party during the silent intervals. As shown in FIGS. 5 and 6, the detector 116 comprises an amplifier 120, a monostable multivibrator 122 having transistors 124 and 125, a coupling circuit 126, and a bistable multivibrator 128 having transistors 130, 132, and 134. The detector 116 is energized by the battery 110, a terminal 135 being connected to the positive side of the battery and a terminal 136 being connectable to the negative side of the battery. In addition, the detector 116 receives incoming signals from the telephone line via the transformer 118, a terminal 138 being connectable to one side of the secondary of the transformer and the terminal 136 being connectable to the other side of the secondary. Finally, the output of the detector 116 appears at a terminal 140.

The coupling circuit 126 of the detector 116 serves to connect the output of the monostable multivibrator 122 to one or the other of the inputs of the bistable multivibrator 128. This is accomplished by means of a terminal 142 that is connectable either to a terminal 144 or a terminal 145. When the terminal 142 is connected to the terminal 144, a path is provided from the output of the monostable multivibrator 122 to the base of the transistor 130, and when the terminal 142 is connected to the terminal 145, a path is provided between the output of the monostable multivibrator and the base of the transistor 132. These paths are effectively shunted by capacitors 146 and 148, respectively, to prevent operation of the stable multivibrator 128 on the first operation of the monostable multivibrator 122.

When the detector 116 is energized, the monostable multivibrator 122 assumes its stable state in which transistor 125 is on and transistor 124 is off, and the bistable multivibrator 128 assumes a first stable state in which transistor 130 is on and transistor 132 is off. Then during the first silent interval, the detector 116 is connected across the secondary of the transformer 118, the primary of the transformer being connected across the telephone line, and a connection is provided between terminals 142 and 145 of the coupling circuit 126. The telephone line is thereby connected to the input of the detector 116 and hte output of the monostable multivibrator 122 is thereby connected to the base of transistor 132 of the bistable multivibrator 128.

With the monostable multivibrator 122 in a quiescent condition, there is effectively no output from the monostable multivibrator. However, when a signal having a positive amplitude of a preselected minimum value is received by the detector 116 and amplified by the amplifier 120, it triggers the monostable multivibrator 122 causing the monostable multivibrator to briefly switch to its unstable state, in which transistor 124 is on and transistor 125 is off. An output pulse is produced thereby that charges the capacitor 148 through a resistor 150. The capacitor 148 thereafter commences to discharge through a resistor 152 and a varistor 154, a diode 155 preventing discharge of the capacitor through a transistor 125 of the monostable multivibrator 122.

If the incoming signal to the detector 116 is sporadic, such as would be the case if it is caused by noise on the telephone line, it permits the capacitor 148 to discharge between repetitive triggering of the monostable multivibrator 122. However, if the incoming signal is of the proper amplitude and frequency, it will during the first silent interval repeatedly trigger the monostable multivibrator 122 at a rate that fully charges the capacitor 148 and then triggers the bistable multivibrator 128 to turn transistor 132 on and transistor 130 off. The term frequency as used herein refers to the repetitive nature of the signal and thus the signal may have a sinusoidal character, such as that produced by an oscillator, or a transient character, such as that produced by a pulse generator. The significant factor is that the repetitive peaks of the signal be of a minimum amplitude and reoccur with a certain frequency.

The character of the incoming signal necessary to trigger the bistable multivibrator 128 is of course determined by the values of the elements comprising the amplifier 120, the monostable multivibrator 122, and the coupling circuit 126. Advantageously, these values are selected so as to permit triggering of the bistable multivibrator 128 by the pulsing of a digit five or greater on a conventional telephone dial. It is also triggered by the ringing and busy signals generated by the central office.

If during the first silent interval a signal of the proper amplitude and frequency is received by the detector 116 the bistable multivibrator changes to its second stable state wherein the transistor 132 is on and transistor 130 is off. But if no signal is received or a signal of the improper amplitude and frequency is received, the bistable multivibrator 128 remains in its first stable state wherein transistor 130 remains on and transistor 132 remains off.

At the end of the first silent interval, terminal 142 is disconnected from terminal 145 and at the beginning of the second silent interval, terminal 142 is connected to terminal 144, whereby the output of the monostable multivibrator 122 is connected to the base of transistor 130 of the bistable multivibrator 128. Each time the monostable multivibrator 122 is triggered, it charges the capacitor 146, the capacitor then discharging through a resistor 156 and varistor 154. However, if a signal of the proper amplitude and frequency is received by detector 116, the monostable multivibrator 122 is repeatedly triggered at a rate that fully charges the capacitor 146 and then triggers the bistable multivibrator 128 to turn transistor 130 on and transistor 132 off.

From the foregoing it is seen that when a signal of the proper amplitude and frequency is received during the first silent interval and is again received during the second silent interval, the bistable multivibrator 128 is returned to its first stable state, wherein transistor 130 is on and transistor 132 is off. When a signal of the proper amplitude and frequency is not received during the first silent interval, then regardless of whether such a signal is received during the second silent interval, the bistable multivibrator 128 remains in its first stable state wherein transistor 130 is on and transistor 132 is off. However, when a signal of the proper amplitude and frequency is received during the first silent interval and is not received during the second silent interval, then the bistable multivibrator 128 is held in its second stable state wherein the transistor 132 is on and transistor 130 is off. Consequently, only one course of action places the bistable multivibrator 128 in its second stable state, that course being the receipt of a signal of the proper amplitude and frequency during the first silent interval and not during the second. All other courses of action result in the bistable multivibrator 128 being placed in its first stable state.

At the end of the second silent interval terminal 142 is disconnected from terminal 144, and terminal 140 is connected to the positive side of the battery 110 through the relay R. If the bistable multivibrator 128 is in its second stable state, the output transistor 134 is turned on and a path is provided between terminals 140 and 136, the path indicating that the proper response has been received to the identification request signal. If, on the other hand, the bistable multivibrator 128 is in its first stable state, the output transistor 134 is not turned on and no path is provided beween terminals 140 and 136. This indicates that the proper response has not been received.

The identification request signal can of course be modified to include three or more silent intervals, in which case a more exacting identifying response signal is required of the called or calling party. Furthermore, the detector 116 in combination with means for transmitting sound over the telephone line and means for switching between the sound transmitting means and the detector provides an audibly operated combination lock, and such a lock can be employed in conjunction with apparatus other than an automatic reporting telephone. Such a lock could, for example, be used to turn on a home appliance from a distant station.

The circuit of the automatic reporting telephone further includes a customer input circuit 158 comprising a transistor 160 having the base thereof connected to the terminal 103. When a closure is provided between terminals 103 and 104, the base of the transistor 160 is connected to the positive side of the rectifier 114 and the transistor is turned on. However, a capacitor 162 and a resistor 164 are connected in series with the base of the transistor 160, the capacitor being shunted by a resistor 165 having a large resistance, and when the capacitor is fully charged, current flow effectively stops and the transistor turns off. Consequently, regardless of the duration of the closure across terminals 103 and 104, the transistor 160 is turned on for only a limited period of time.

Finally, the circuit of the automatic reporting telephone includes an external circuit path, shown in FIG. 5A, that is connected intermediate a power source and the message transmitter. The circuit path includes the normally open input contacts $R_1$ and the normally open sequential contacts $S_{13-14}$ connected in series and when both pairs of contacts are closed, the message transmitter is energized by the power source.

*Description of operation*

Referring to FIG. 5, when the automatic reporting telephone is in a quiescent condition, which is considered to be its normal condition, the answering relay U is connected across the telephone line, a path being provided from the tip side of the line through the tip terminal 101, the normally closed contact $T_{6-7}$, a varistor 166, capacitor 168, the answering relay, and the ring terminal 102 to the ring side of the line. The varistor 166 prevents operation of the answering relay U by a voltage below a certain threshold level, while the capacitor 168 prevents the flow of line current. In addition, the plug 108 is connected to a 110 volts, 60 cycle power source, and hence the battery 110 is being charged by the direct current voltage provided by the transformer 112 and the rectifier 114.

Upon the occurrence of the predetermined condition that the automatic reporting telephone is to report, the apparatus that the automatic reporting telephone is monitoring provides a momentary closure across the terminals 103 and 104. The transistor 160 is thereby turned on, and a path is provided from the positive side of the battery 110 through the normally closed sequential contacts $D_{7-8}$, the input detector relay R, the collector and emitter of the transistor, and the normally closed contacts $T_{8-9}$ to the negative side of the battery. The input detector relay R is energized, and the closure of the normally open contacts $R_3$ thereof connects the solenoid $T_0$ across the battery 110, current flowing from the positive side of the battery through the solenoid, the normally closed sequential contacts $S_{5-6}$, and the closed normally open input contacts $R_3$ to the negative side of the battery.

As shown in FIG. 1, the energization of the solenoid $T_0$ moves the programmed member 62 to a downward position, operating the switching means T and removing the tab 60 from the path of the finger 58 depending from the programmed member 56. As the programmed member 62 reaches the downward position, a notch in the side thereof moves into juxtaposition with the pin 86 on the armature 82 of the solenoid $T_R$, and the spring 85 on the armature moves the pin into the notch, locking the programmed member in the downward position.

The operation of the switching means T closes the normally open contacts $T_{1-2}$ and $T_{5-6}$ thereof and opens the normally closed contacts $T_{3-4}$, $T_{6-7}$, $T_{8-9}$, and $T_{10-11}$ thereof. The closure of the normally open contacts $T_{1-2}$ connects the solenoid $T_R$ to the postive side of the battery 110, while the closure of the normally open contacts $T_{5-6}$ places a short across the primary of the transformer 118. The opening of the normally closed contacts $T_{3-4}$ removes a short from across the pulsing contacts $P_1$, and the opening of the normally closed contacts $T_{6-7}$ disconnects the answering relay U from the tip terminal 101. Finally, the opening of the normally closed contacts $T_{8-9}$ disconnects the input detector relay R from the negative side of the battery 110, de-energizing the relay, and the opening of the normally closed contacts $T_{10-11}$ provides an opening in the output path of the external message transmitter. The de-energization of the input detector relay R reopens the normally open contacts $R_3$ thereof, which in turn de-energizes the solenoid $T_0$ by disconnecting it from the negative side of the battery 110.

With the removal of the tab 60 from the path of the finger 58 depending from the programmed member 56, the motor spring 54 acting through the disc 55 and the shaft 50 commences to rotate the programmed member in a counterclockwise direction with respect to the holder 75, thereby commencing the operation of the sequential switching means S. The speed of rotation of the programmed member 56 is controlled by the clock escapement 64, and after an interval of time, the normally closed sequential contacts $S_{5-6}$ open to provide another interruption in the path of the solenoid $T_0$ across the battery 110.

Shortly thereafter, the normally open sequential contacts $S_{1-2}$ close and connect the automatic reporting telephone across the telephone line, current flowing from the tip terminal 101 through the closed normally open ontacts $T_{5-6}$, the normally closed sequential contacts $D_{14-15}$, either the normally closed pulsing contacts $P_1$, normally closed initiating and terminating contacts $P_2$, or normally closed interdigital contacts $P_3$, the closed normally open sequential contacts $S_{1-2}$, and a load resistor 170 to the ring terminal 102.

After a delay of about ten seconds to permit the central office to react to the appearance of the automatic reporting telephone across the telephone line and place a dial tone on the line, the normally open sequential contacts $S_{3-4}$ close and connect the motor 10, which has an inductor 172 in series therewith and a capacitor 174 in parallel therewith to limit motor noise, across the battery 110. The motor 10 is energized and commences to rotate, and as a result the pulsing cam 20, the number selecting member 26, and the programmed member 42 commence to rotate. The rotation of the pulsing cam 20 together with the first revolution of the number selecting member 26 results in the calling of the telephone number preselected by the spacing of the interdigital clips 34 on the number wheel, while the rotation of the programmed member 42 commences the operation of the sequential switching means D.

As the number selecting member 26 starts to rotate, the initiating arm 30 mounted thereon actuates the initiating and terminating switch $P_2$ to open the normally closed contacts thereof, and as the number selecting member continues to rotate, the normally closed interdigital contacts $P_3$ are open for varying intervals by the disengagement of the contacts from the interdigital clips 34, the spacing between the clips being proportionate to the values of the digits represented thereby. During the intervals that both the initiating and terminating contacts $P_2$ and the interdigital contacts $P_3$ are open, the only path for the telephone line current is through the normally closed pulsing contacts $P_1$. However, each revolution of the pulsing cam 20 opens the normally closed pulsing contacts $P_1$, and thus during these intervals the telephone line is interrupted and groups of pulses corresponding to the preselected digits are transmitted to the central office.

Shortly after the transmission of the preselected telephone number commences, the normally closed sequential contacts $D_{7-8}$ open in the input detector relay R path and the normally closed sequential contacts $D_{7-9}$ open in the solenoid G path. In addition, the normally open sequential contacts $D_{11-12}$ close to provide a path in parallel with the closed normally open sequential contacts $S_{3-4}$. At about the same time the normally open sequential contacts $S_{5-7}$ close in the solenoid $T_R$ path and the normally open sequential contacts $S_{5-8}$ close in the input detector relay R path.

After the last digit of the preselected telephone number is transmitted, the terminating arm 32 operates the initiating and terminating switch $P_2$ to close the normally closed contacts thereof. Thus during the remainder of the revolution of the number selecting member 26, a shunt path is provided around the normally closed pulsing contacts $P_1$, whereby the opening of the pulsing contacts does not interrupt the telephone line.

As the number selecting member 26 completes a first revolution, the programmed member 42 completes one-third of a revolution, and the normally closed sequential contacts $D_{14-15}$ open while the normally open sequential contacts $D_{13-14}$ close. The opening of the normally closed sequential contacts $D_{14-15}$ removes a short from across the primary of the transformer 118, and the closing of the normally open sequential contacts $D_{13-14}$ prevents the interruption of the telephone line by the opening of the normally closed pulsing contacts $P_1$ when the normally closed initiating and terminating contacts $P_2$ and the normally closed interdigital contacts $P_3$ are open. The normally open sequential contacts $D_{13-14}$ remain closed for the remainder of the revolution of the programmed member 42, and thus no pulses are transmitted during the second and third revolutions of the number selecting member 26.

The interval of time during which the programmed member 42 rotates through the second third of a revolution provides the necessary time for the central office to ring the called station and for the monitor at the called station to answer. Shortly after the programmed member 42 commences this portion of the revolution, the normally open sequential contacts $D_{4-5}$ close and connect the audible signal generator 115 across the battery 110 through the secondary of the transformer 118. The signal generator 115 is thereby energized and begins to transmit an audible signal out over the telephone line via the transformer 118, the audible signal providing the first interval of sound of the identification request signal. When the monitor at the called station answers, the audible signal informs him that the automatic reporting telephone is calling and prepares him to respond during the silent interval that follows.

Referring also to FIG. 5A, during this time, the normally open sequential contacts $S_{11-12}$ and $S_{13-14}$ close in individual paths of the external message transmitter in preparation for the operation thereof. In addition, the normally open sequential contacts $S_{3-4}$ open, the closed normally open sequential contacts $D_{11-12}$ maintaining the connection of the motor 10 across the battery 110.

As the programmed member 42 begins the last third of its revolution, the normally open sequential contacts $D_{10-11}$ close and connect the detector 116 across the battery 110 and to one side of the secondary of the transformer 118. Referring also to FIG. 6, the energization of the detector 116 places the monostable multivibrator 122 in its stable state wherein transistor 124 is off and transistor 125 is on, and places the bistable multivibrator 128 in its first stable state wherein transistor 130 is on and transistor 132 is off.

Thereafter the closed normally open sequential contacts $D_{4-5}$ open and disconnect the audible signal generator 115 from across the battery 110, thereby terminating the first interval of sound and initiating a first interval of silence. The normally open sequential contacts $D_{5-6}$ then close followed by the closing of the normally open sequential contacts $D_{1-2}$. The closed normally open sequential contacts $D_{5-6}$ connect the detector 116 to the other side of the secondary of the transformer 118, while the closed normally open sequential contacts $D_{1-2}$ provide a path between terminals 142 and 145, thereby connecting the output of the monostable multivibrator 122 to the base of transistor 132 of the bistable multivibrator 128.

If at this time the monitor transmits a signal of the proper amplitude and frequency, the monostable multivibrator 122 is triggered at a rate that fully charges the capacitor 148 and then switches the bistable multivibrator 128 to its second stable state wherein transistor 132 is on and transistor 130 is off. If no signal is transmitted or a signal of the improper amplitude and frequency is transmitted, the bistable multivibrator 128 remains in its first stable state.

A signal of the proper amplitude and frequency is transmitted in the following three ways. First, if the called station does not answer, the signal is transmitted by the generation of a ringing tone by the central office. Second, if the called station is busy, the signal is transmitted by the generation of a busy tone by the central office. Third, if the called station has answered, the signal is transmitted by the dialing of the digit five or greater by the called party.

The first interval of silence is terminated by the opening of the closed normally open sequential contacts $D_{1-2}$ and $D_{5-6}$, whereby the output of the monostable multivibrator 122 is disconnected from the input of the bistable multivibrator 128 and the detector 116 is disconnected from across the transformer 118. The second interval of sound is then initiated by the closing of the normally open sequential contacts $D_{4-5}$, whereby the audible signal generator 115 is reconnected across the transformer 118. The second interval of sound is relatively short and serves only to signify the end of the first interval of silence.

The second interval of sound is terminated by the opening of the closed normally open sequential contacts $D_{4-5}$, whereby the audible signal generator 115 is again disconnected from across the transformer 118, and then the second interval of silence is initiated by the closing of the normally open sequential contacts $D_{5-6}$ and $D_{2-3}$. The detector 116 is thereby reconnected across the transformer 118, and terminals 142 and 144 of the detector are connected together, whereby the output of the monostable multivibrator 122 is connected to the base of the transistor 130 of the bistable multivibrator 128.

If a signal of the proper amplitude and frequency was not received during the first silent interval and is not received during the second silent interval, the bistable multivibrator 128 remains in its first stable state wherein transistor 130 is on and transistor 132 is off. If a signal of the proper amplitude and frequency was not received during the first silent interval but is received during the second silent interval, the bistable multivibrator 128 again remains in its first stable state inasmuch as the output of the monostable multivibrator 122 only acts to keep it there. If a signal of the proper amplitude and frequency was received during the first silent interval and is again received during the second silent interval, the bistable multivibrator 128 is switched from its second stable state to its first stable state. Finally, if a signal of the proper amplitude and frequency was received during the first silent interval but is not received during the second silent interval, the bistable multivibrator remains in its second stable state wherein transistor 132 is on and transistor 130 is off.

Thus it is seen that all courses of action but one result in the bistable multivibrator 128 being in its first stable state at the end of the second silent interval. Only the receiving of a signal of the proper amplitude and frequency during the first silent interval and not during the second silent interval results in the bistable multivibrator 128 being in its second stable state at the end of the second silent interval.

The second silent interval is terminated by the opening of the normally open sequential contacts $D_{2-3}$ and $D_{5-6}$, whereby the output of the monostable multivibrator 122 is disconnected from the input of the bistable multivibrator 128 and the detector 116 is disconnected from across the transformer 118. A third interval of sound that signifies the end of the identification request signal is then initiated and shortly thereafter terminated by the closing and opening of the normally open sequential contacts $D_{4-5}$, whereby the audible signal generator 115 is briefly connected across the transformer 118. At the same time the open normally closed sequential contacts $D_{7-8}$ close and connect the input detector relay R to the positive side of the battery 110.

If the detector 116 has received the proper response to the identification request signal, the bistable multivibrator 128 is in its second stable state wherein transistor 132 is on and transistor 130 is off. With transistor 132 being on, output transistor 134 is also on and a path is provided between terminals 140 and 136 of the detector 116. The input detector relay R is thereby connected to the negative side of the battery 110 and is energized. If the detector 116 has not received the proper response to the identification request signal, the bistable multivibrator 128 is in its first stable state wherein transistor 130 is on and transistor 132 is off. Hence, no path is provided between terminals 140 and 136 of the detector 116 and the input detector relay R is not energized.

Taking the latter situation first wherein the proper signal is not received, a short period after the sequential contacts $D_{7-8}$ close, the closed normally open sequential contacts $D_{10-11}$ and $D_{13-14}$ open and the open normally closed sequential contacts $D_{14-15}$ close. The opening of the sequential contacts $D_{10-11}$ de-energizes the detector by disconnecting it from the negative side of the battery 110. The opening of the sequential contacts $D_{13-14}$ removes a short from across the pulsing contacts $P_1$ and contacts $S_{1-2}$, while the closing of the sequential contacts $D_{14-15}$ places a short across the primary of the transformer 118.

Thereafter, the open normally closed sequential contacts $D_{7-9}$ close in the path of the solenoid G and the closed normally open sequential contacts $D_{11-12}$ open in the path of the motor 10. The motor 10 is thereby de-energized and the rotation of the programmed member 42 and thereby the operation of the sequential switching means D is terminated. This is followed by the opening of the closed normally open sequential contacts $S_{1-2}$ whereby the telephone line is dropped by the disconnecting of the automatic reporting telephone from across the telephone line.

About four minutes later the normally open sequential contacts $S_{1-2}$ reclose to seize the telephone line by reconnecting the automatic reporting telephone thereacross. After about a ten second delay, the normally open sequential contacts $S_{3-4}$ close to connect the motor 10 across the battery 110. The energized motor commences to rotate the number selecting member 26 and the programmed member 42 and thereby commences a second calling of the preselected number and transmission of the identification request signal.

If the proper response is again not received to the identification request signal, the automatic reporting telephone continues to repeat the cycle. If necessary, the cycle is repeated four times. If the proper response is not received during the fifth cycle, at the end of the cycle the normally open sequential contacts $S_{4-7}$ close and connect the solenoid $T_R$ across the battery 110. The energization of the solenoid $T_R$ withdraws the pin 86 on the armature 82 thereof from the notch in the programmed member 62. The programmed member 62 under the bias of the spring 84 on the armature 80 of the solenoid $T_0$ returns to its normal position thereby returning the switching means T to its normal condition.

The closed normally open contacts $T_{1-2}$ open and de-energize the solenoid $T_R$, while the open normally closed contacts $T_{6-7}$ close and connect the answering relay U across the telephone line. In addition, the open normally closed contacts $T_{8-9}$ close and remove an interruption from the path of the transistor 160 and connect the solenoid G across the battery 110, the normally open sequential contacts $S_{9-10}$ having closed and remained closed since shortly before the commencement of the second calling cycle. The energized solenoid G withdraws the gear 70 of the clock escapement 64 from the pinion 72 affixed to the shaft 50, and the spring 54 rotates the programmed member 56 to its rest position wherein the depending finger 58 is in engagement with the tab 60. The automatic reporting telephone is thereby returned to a quiescent condition.

If the proper response is received to the identification request signal during any of the calling cycles, the input detector relay R is energized, closing the normally open contacts $R_1$, $R_3$, and $R_4$ thereof and opening the normally closed contacts $R_2$ thereof. The closing of the normally open input contacts $R_1$ completes the external path shown in FIG. 5A and connects the message transmitter to a source of power. The opening of the normally closed input contacts $R_2$ provides an interruption in the path of the solenoid G while the closing of the normally open input contacts $R_4$ provides another path other than the closed normally open sequential contacts $D_{13-14}$ and $S_{1-2}$ for connecting the automatic reported telephone across the telephone line.

The closing of the normally open input contacts $R_3$ provides an alternate path to the detector 116 and closed normally open sequential contacts $D_{10-11}$ for connecting the input detector relay R to the negative side of the battery, the alternate path being through a diode 176, the closed normally open sequential contacts $S_{5-8}$ and the input contacts $R_3$. In addition, the closed normally open input contacts $R_3$ connect the solenoid $T_R$ across the battery 110, current flowing from the positive side of the battery through the closed normally open contacts $T_{1-2}$, the solenoid, the closed normally open sequential contacts $S_{5-7}$ and the input contacts $R_3$ to the negative side of the battery.

The energization of the solenoid $T_R$ returns the switching means T to its normal condition in the previously described manner, opening the normally open contacts $T_{1-2}$ and $T_{5-6}$ and closing the normally closed contacts $T_{3-4}$, $T_{6-7}$, $T_{8-9}$, and $T_{10-11}$. The opening of the normally open contacts $T_{1-2}$ de-energizes the solenoid $T_R$ by disconnecting it from the positive side of the battery 110, while the closing of the normally closed contacts $T_{3-4}$ places a short across the pulsing contacts $P_1$. The opening of the normally open contacts $T_{5-6}$ provides an interruption in the shunting path across the primary of the transformer 118, and the closing of the normally closed contacts $T_{6-7}$ connects the answering relay U across the telephone line. The closing of the normally closed contacts $T_{8-9}$ connects the transistor 160 to the negative side of the battery 110 and removes an interruption from the path of the solenoid G, while the closing of the normally closed contacts $T_{10-11}$ connects the output of the message transmitter across the secondary of the transformer 118. The message transmitter at this point commences to transmit a verbal message apprising the called station of the location of the automatic reporting telephone and of the occurrence of the predetermined condition.

Shortly thereafter the closed normally open sequential contacts $D_{10-11}$ open, disconnecting the detector 116 from across the battery 110 whereby the detector is de-energized. At the same time the closed normally open sequential contacts $D_{13-14}$ open to remove a short from around the pulsing contacts $P_1$ and the open normally closed sequential contacts $D_{14-15}$ close to remove an interruption from the shunting path across the primary of the transformer 118. However, the normally closed contacts $T_{3-4}$ and the normally open contacts $T_{5-6}$ respectively perform the functions previously performed by the sequential contacts $D_{13-14}$ and $D_{14-15}$.

The open normally closed sequential contacts $D_{7-9}$ then close removing an interruption from the solenoid G path, and this is followed by the opening of the closed normally open sequential contacts $D_{11-12}$, whereby the motor 10 is de-energized and the operation of the sequential switching means D terminated.

The closed normally open sequential contacts $S_{1-2}$ subsequently open, the connection of the automatic reporting telephone across the telephone line being maintained by the closed normally open input contacts $R_4$, and then the closed normally open sequential contacts $S_{5-7}$ open in the solenoid $T_R$ path. At about the same time the message transmitted by the external message transmitter has been completed, and the closed normally open sequential contacts $S_{13-14}$ open to disconnect the message transmitter from its power source.

A short time later, the closed normally open sequential contacts $S_{9-10}$ close in the solenoid G path, followed by the opening of the closed normally open sequential contacts $S_{5-8}$ in the input detector relay R path. The input detector relay R is disconnected from the negative side of the battery 110 and thereby de-energized and the contacts thereof returned to their normal condition. The closing of the normally closed input contacts $R_2$ connects the solenoid G across the battery 110 and the energized solenoid withdraws the gear 70 of the clock escapement 64 from the pinion 72 affixed to the shaft 50, permitting the spring 54 to rotate the programmed member 56 to its rest position. At the same time the opening of the normally open input contacts $R_4$ disconnects the automatic reporting telephone from the telephone line, and the automatic reporting telephone is returned to a quiescent condition.

To check the automatic reporting telephone to see that it is operating correctly, a monitor at the preselected station called by the automatic reporting telephone, calls the station number of the automatic reporting telephone. In response thereto, the automatic switching equipment of the appropriate central office applies an alternating current ringing voltage to the telephone line with which the automatic reporting telephone is associated, and the ringing voltage appears across the answering relay U. The answering relay U is intermittently energized, and the normally open contacts $U_1$ thereof are intermittently closed, each closure of the contacts energizing the motor 10 by connecting it across the battery 110. Each energization of the motor 10 causes it to rotate the programmed member 42 through a short distance, and after a period of time the energizations rotate the programmed member far enough to open the normally closed sequential contacts $D_{7-8}$ in the input detector relay R path and close the normally open sequential contacts $D_{11-12}$ in the motor 10 path. The motor 10 is thereupon provided with a continuous connection across the battery 110, and the programmed member 42 commences its normal speed of rotation.

A short time later, the normally open sequential contacts $D_{13-14}$ close and connect the automatic reporting telephone across the telephone line, line current flowing from the tip terminal 101 through the primary of the transformer 118, the contacts $D_{13-14}$, and the resistor 170 to the ring terminal 102. It therefore appears to the central office that the automatic reporting telephone has answered, whereby the application of ringing voltage is disconnected and the calling station is connected to the automatic reporting telephone.

The sequential switching means D thereafter interacts with the audible signal generator 115 and the detector 116 to transmit the identification request signal, and when the proper response is received, the input detector relay R is energized in the manner heretofore set forth. The closing of the normally open input contacts $R_3$ energizes the solenoid $T_0$ by connecting it across the battery 110 whereupon the tab 60 is withdrawn from the path of the finger 58 depending from the programmed member 56. As a result, the automatic reporting telephone commences to operate in the same manner as if an actual input from the associated equipment had occurred. Hence, when the sequential contacts $D_{13-14}$ reopen at the end of the revolution of the programmed member 42 and disconnect the automatic reporting telephone from the telephone line, the automatic reporting telephone, if it is in proper working order, will then proceed to reconnect to the telephone line, call the preselected station, and respond to the proper signal from the monitor thereat by transmitting the recorded message.

What is claimed is:

1. Apparatus associated with a telephone line comprising:
- a relay energized responsive to a ringing voltage across the telephone line;
- a motor energized responsive to the energization of the relay;
- sequential switching means operated responsive to the energization of the motor;
- means responsive to the operation of the sequential switching means for seizing the telephone line;
- an audible signal generator periodically energized by the operation of the sequential switching means, the output of the signal generator being connected to the telephone line to provide an outgoing signal comprising alternate intervals of sound and silence;
- multistate means for detecting responses to the outgoing signal, the multistate means being connected to the telephone line during the intervals of silence by the sequential switching means, the multistate means changing states responsive to an incoming signal of a preselected amplitude and frequency received during the intervals; and
- means actuated responsive to the multistate means being in a particular state.

2. Apparatus associated with a telephone line comprising:
- sequential switching means;
- means responsive to a ringing voltage on the telephone line for initiating the operation of the sequential switching means;
- means responsive to the operation of the sequential switching means for seizing the telephone line;
- means responsive to the operation of the sequential switching means for thereafter transmitting a periodic signal out on the telephone line;
- means for detecting responses to the transmitted signal during the intervals between the periods of transmission, the detecting means being placed in a particular condition responsive to signals of a preselected amplitude and frequency received during only certain of the intervals; and
- means actuated when the detecting means is in the particular condition.

3. Apparatus associated with a telephone line comprising:
- first switching means actuated responsive to a ringing voltage on the telephone line for seizing the telephone line;
- a signal generator;
- an energizing source;
- second switching means actuated subsequent to the first switching means for periodically connecting the signal generator to the energizing source, the signal generator transmitting a periodic signal out on the telephone line;
- means for detecting responses to the transmitted signal, the detecting means comprising an amplifier, a monostable multivibrator connected to the output of the amplifier, a bistable multivibrator having a pair of inputs connectable to the output of the multivibrator, and a coupling path for connecting the output of the monostable multivibrator with one of the inputs of the bistable multivibrator, the coupling path being shunted by a capacitor having a discharge path in parallel therewith; and
- third switching means actuated to connect the detecting means to the telephone line during the intervals between the periods of transmission, the detecting means providing a path across the energizing source in response to a signal of a particular amplitude and frequency received during certain of the intervals.

4. An apparatus as in claim 3 further including an individual coupling path for connecting each input of the bistable multivibrator with the output of the monostable multivibrator, and fourth switching means for connecting one or the other of the coupling paths to the output of the monostable multivibrator during the intervals between the periods of transmission.

5. Apparatus associated with a telephone line for automatically reporting when a predetermined condition occurs, the apparatus comprising:
- means responsive to the occurrence of the predetermined condition for seizing the telephone line;
- means responsive to the occurrence of the predetermined condition for thereafter transmitting dial signals corresponding to a preselected station;
- means responsive to the occurrence of the predetermined condition for thereafter periodically energizing an audible signal generator and transmitting the sound produced thereby out on the telephone line;
- multistate means for detecting responses to the audible signal during the intervals between the periods of transmission, the multistate means changing states responsive to signals of a preselected amplitude and frequency received during the intervals; and
- means responsive to the multistate means being in a particular state for energizing a message transmitter for transmitting a message apprising the preselected station of the occurence of the predetermined condition.

6. Apparatus associated with a telephone line for automatically reporting when a predetermined condition occurs, the apparatus comprising:
- first switching means actuated responsive to the occurrence of the predetermined condition for seizing the telephone line;
- second switching means actuated subsequent to the first switching means for transmitting out on the telephone line dial signals corresponding to a preselcted station;
- a signal generator;
- an energizing source;
- third switching means actuated subsequent to the first switching means for periodically connecting the signal generator to the energizing source, the signal generator transmitting a signal out on the telephone line;

means for detecting responses to the transmitted signal;

fourth switching means actuated to connect the detecting means to the telephone line during the intervals between periods of transmission, the detecting means being placed in a particular condition responsive to signals of a preselected amplitude and frequency received during only certain of the intervals; and means responsive to the detecting means being in the particular condition for energizing a message transmitter for reporting to the preselected station.

7. An apparatus as in claim 6 wherein the detecting means comprises an amplifier, a monostable multivibrator connected to the output of the amplifier, a bistable multivibrator having a pair of inputs connectable to the output of the monostable multivibrator, and a coupling path for connecting the output of the monostable multivibrator with one of the inputs of the bistable multivibrator, the coupling path being shunted by a capacitor having a discharge path in parallel therewith.

8. An apparatus as in claim 7 further including an individual coupling path for connecting each input of the bistable multivibrator with the output of the monostable multivibrator, and fifth switching means for connecting one or the other of the coupling paths to the output of the monostable multivibrator during the intervals between the periods of transmission.

References Cited

UNITED STATES PATENTS

| | | | |
|---|---|---|---|
| Re. 26,099 | 10/1966 | Stoffels | 179—3 |
| 2,780,671 | 2/1957 | Thery | 179—5 |
| 3,166,641 | 1/1965 | Kreiner | 179—5 |

ROBERT L. GRIFFIN, *Primary Examiner.*

WILLIAM S. FROMMER, *Assistant Examiner.*

U.S. Cl. X.R.

179—5